Oct. 16, 1945.   E. S. DENNISON   2,387,124
TORPEDO LAUNCHING GEAR
Filed Nov. 8, 1943   12 Sheets-Sheet 1
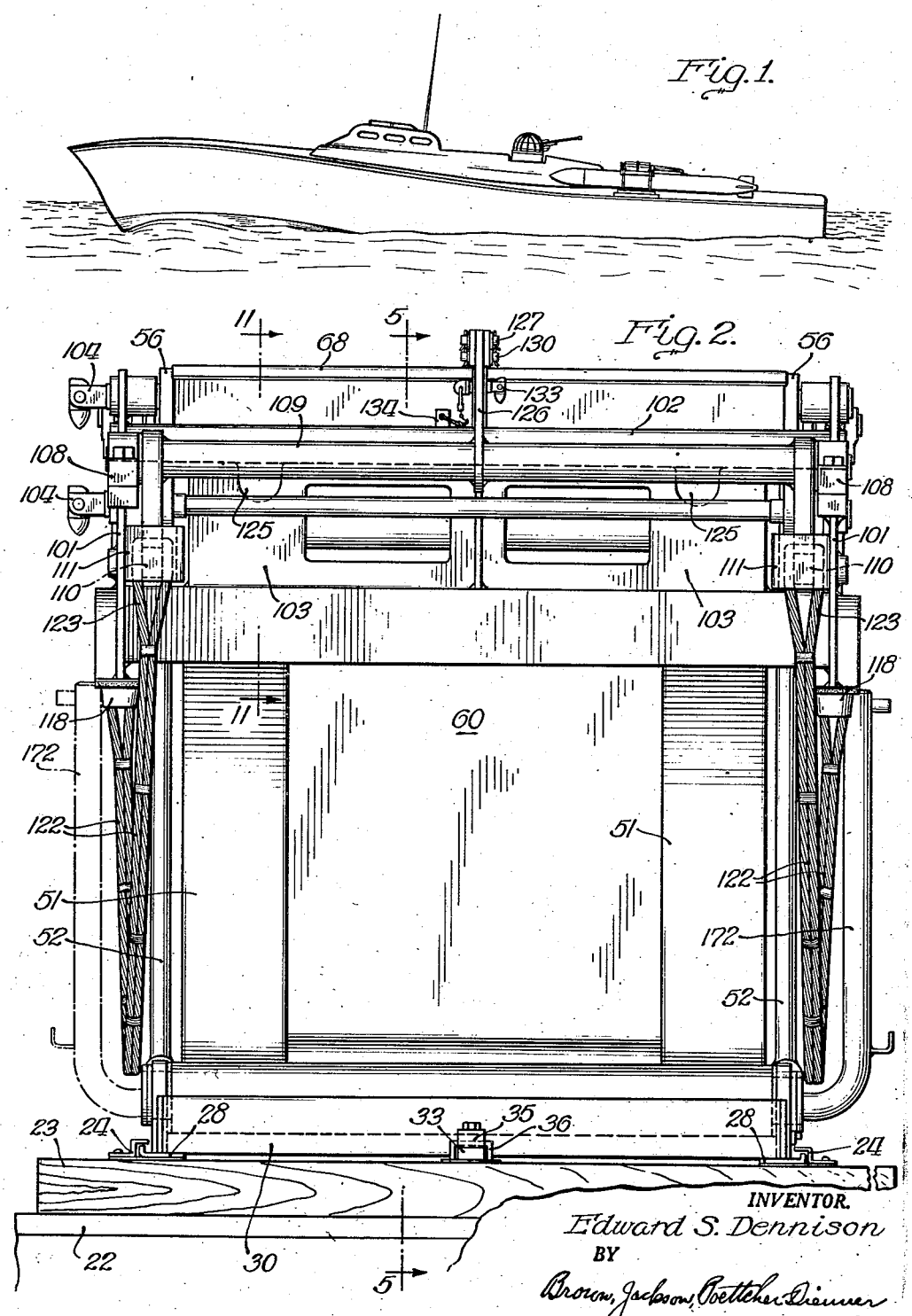
INVENTOR.
Edward S. Dennison
BY
Brown, Jackson, Boettcher & Dienner
Attys.

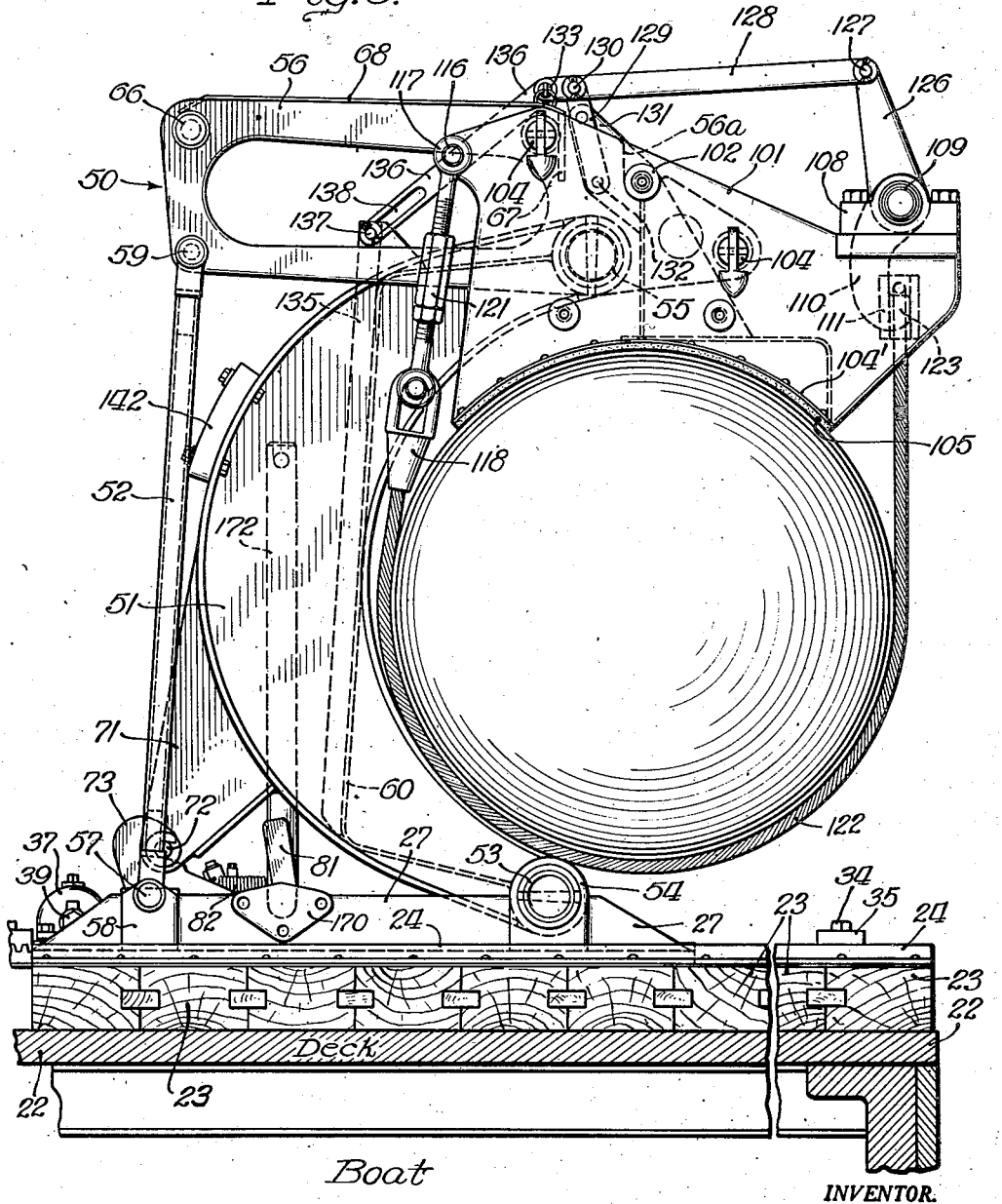

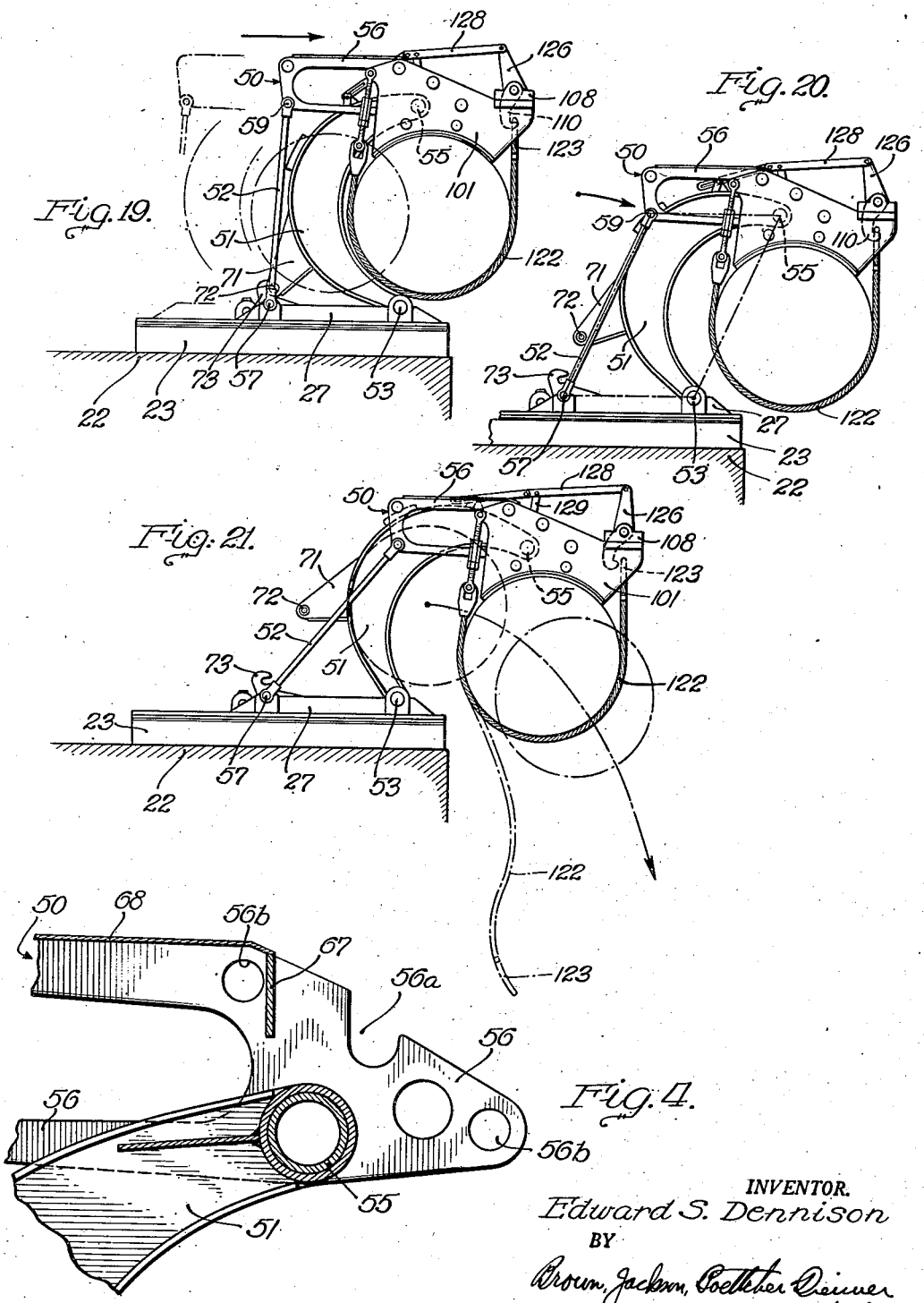

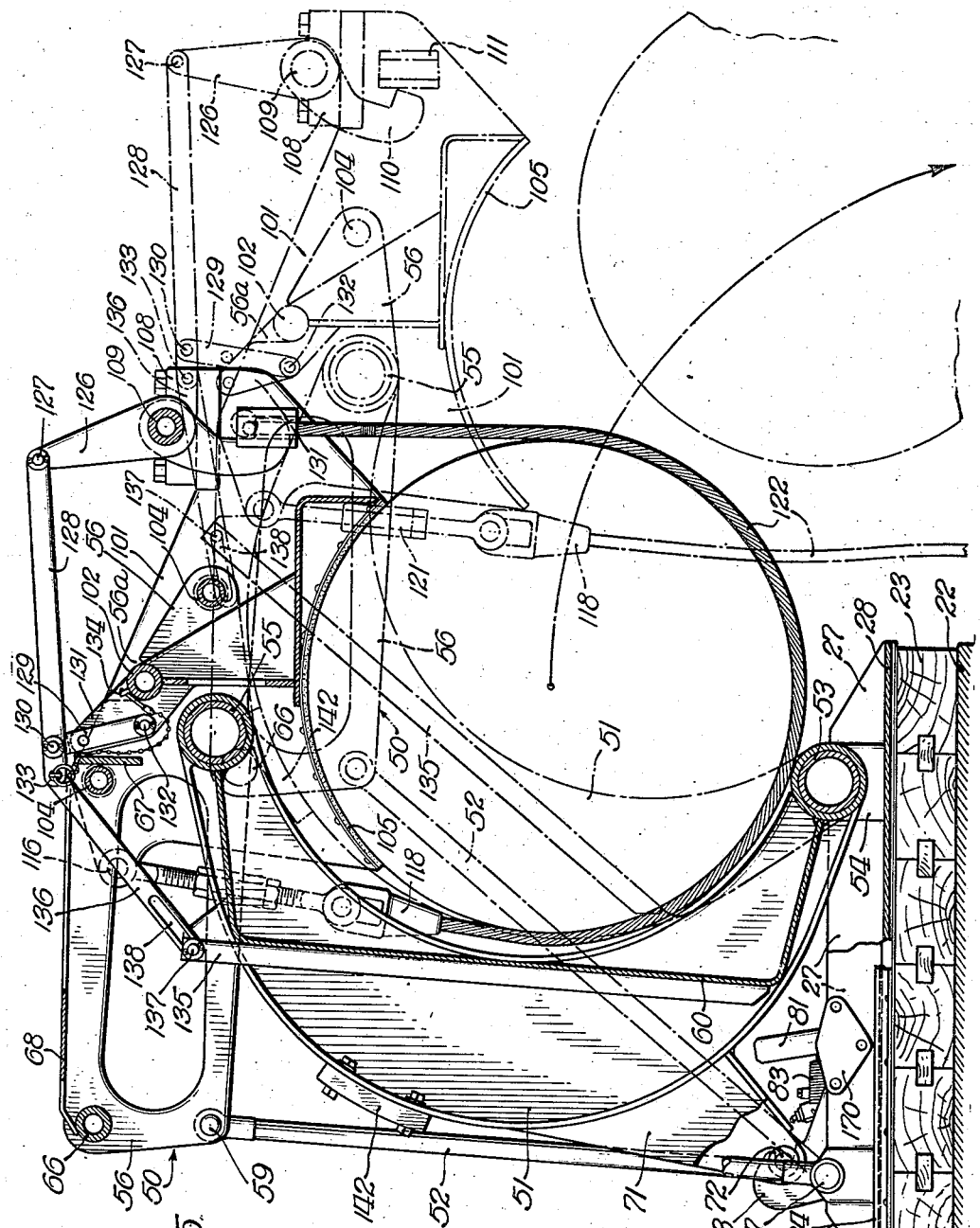

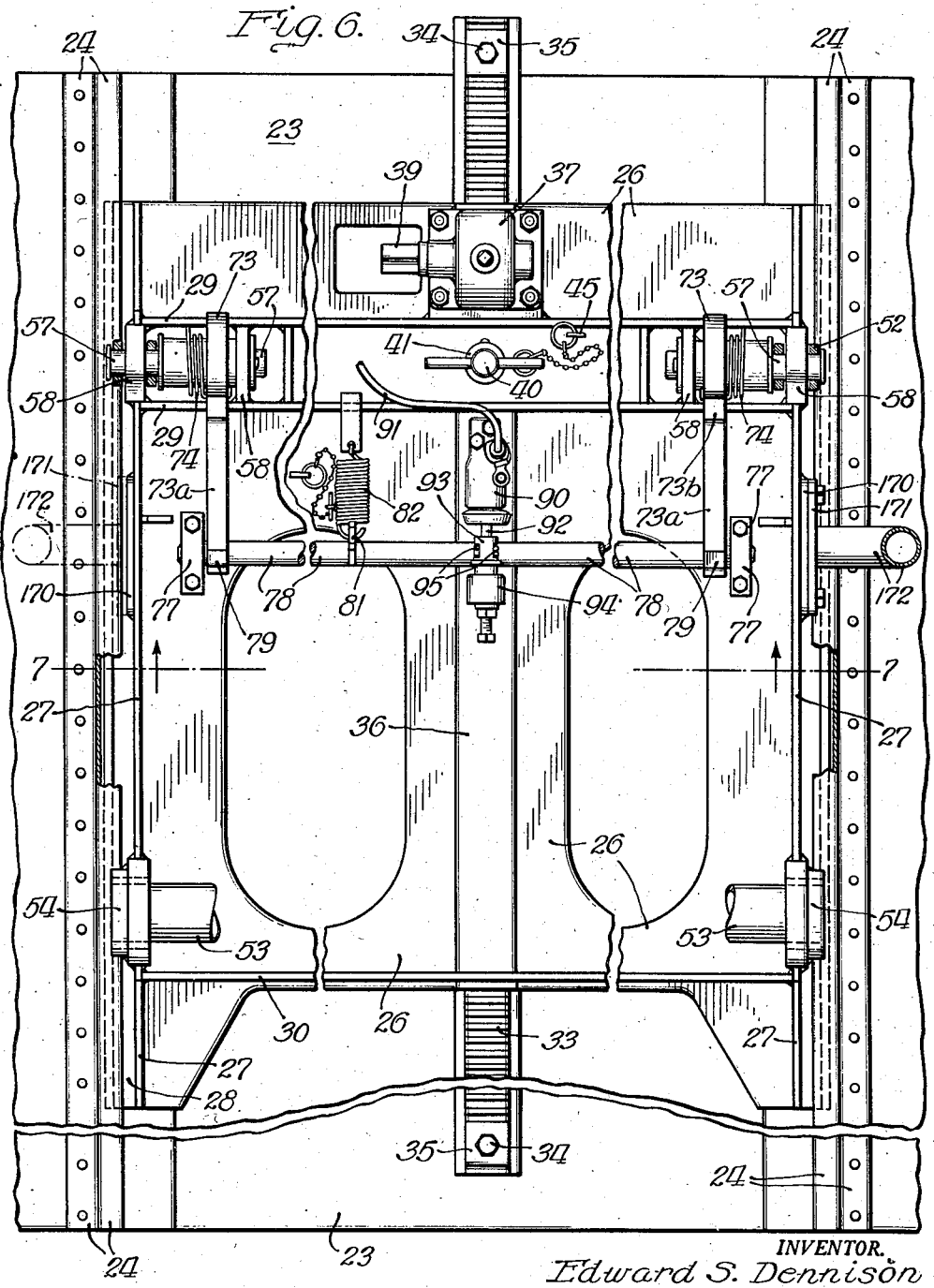

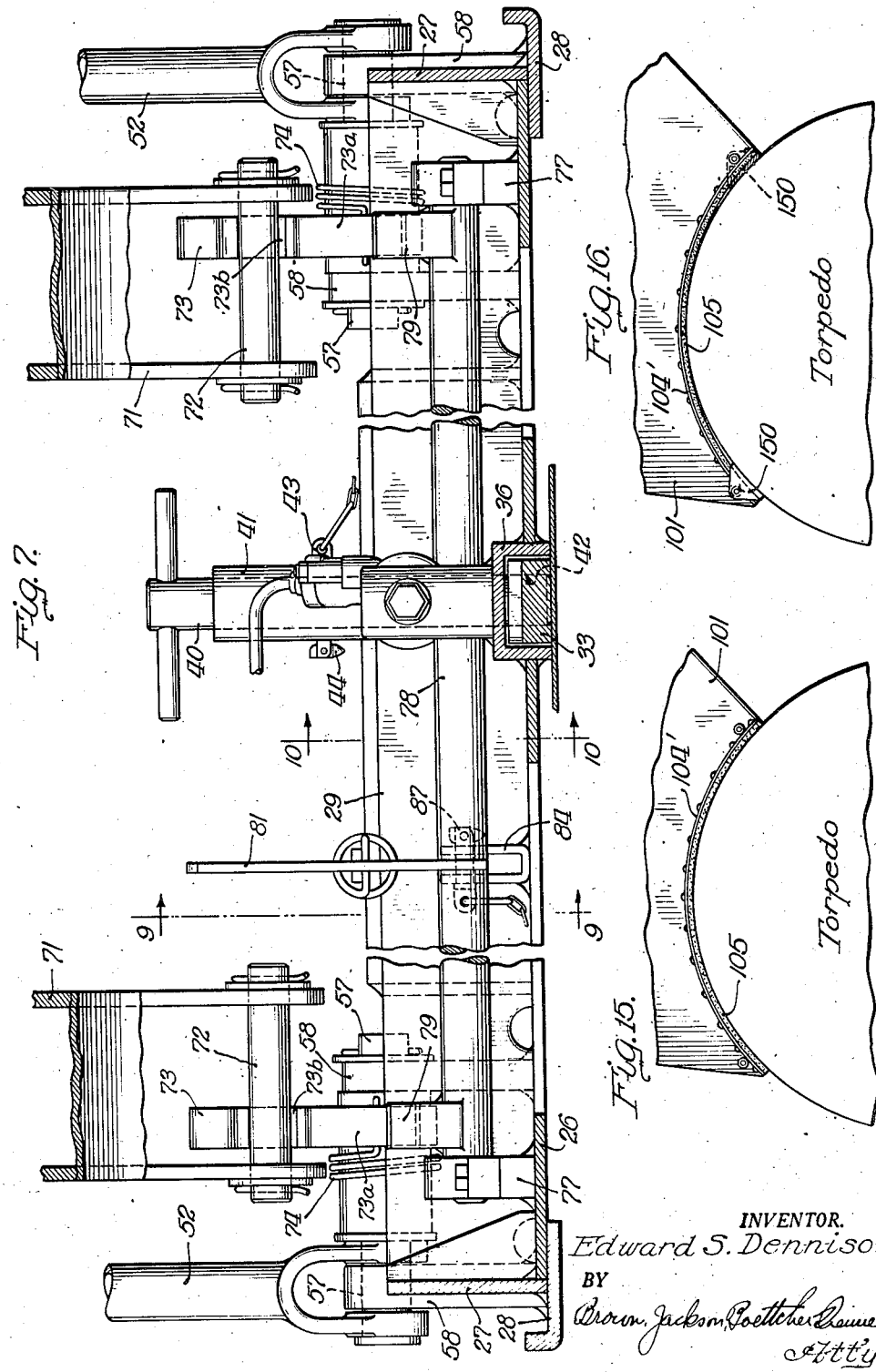

Oct. 16, 1945. E. S. DENNISON 2,387,124
TORPEDO LAUNCHING GEAR
Filed Nov. 8, 1943 12 Sheets-Sheet 7
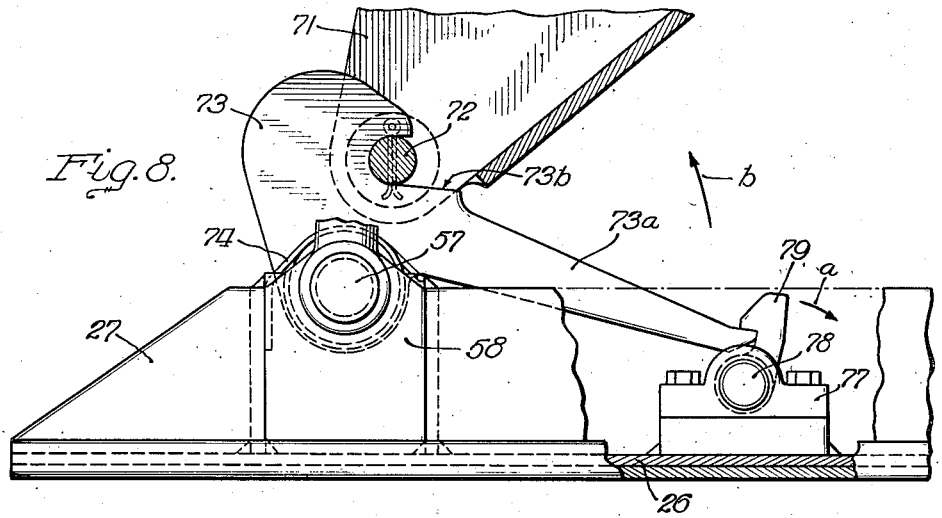
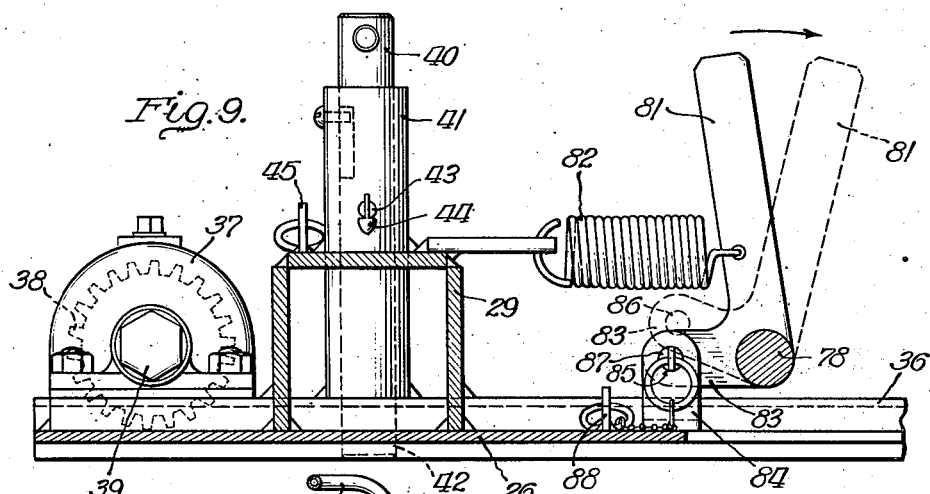
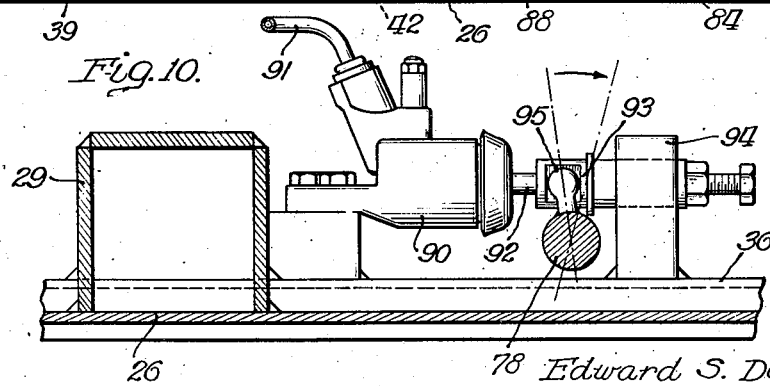
INVENTOR.
Edward S. Dennison
BY
Brown, Jackson, Boettcher Dienner
Attys.

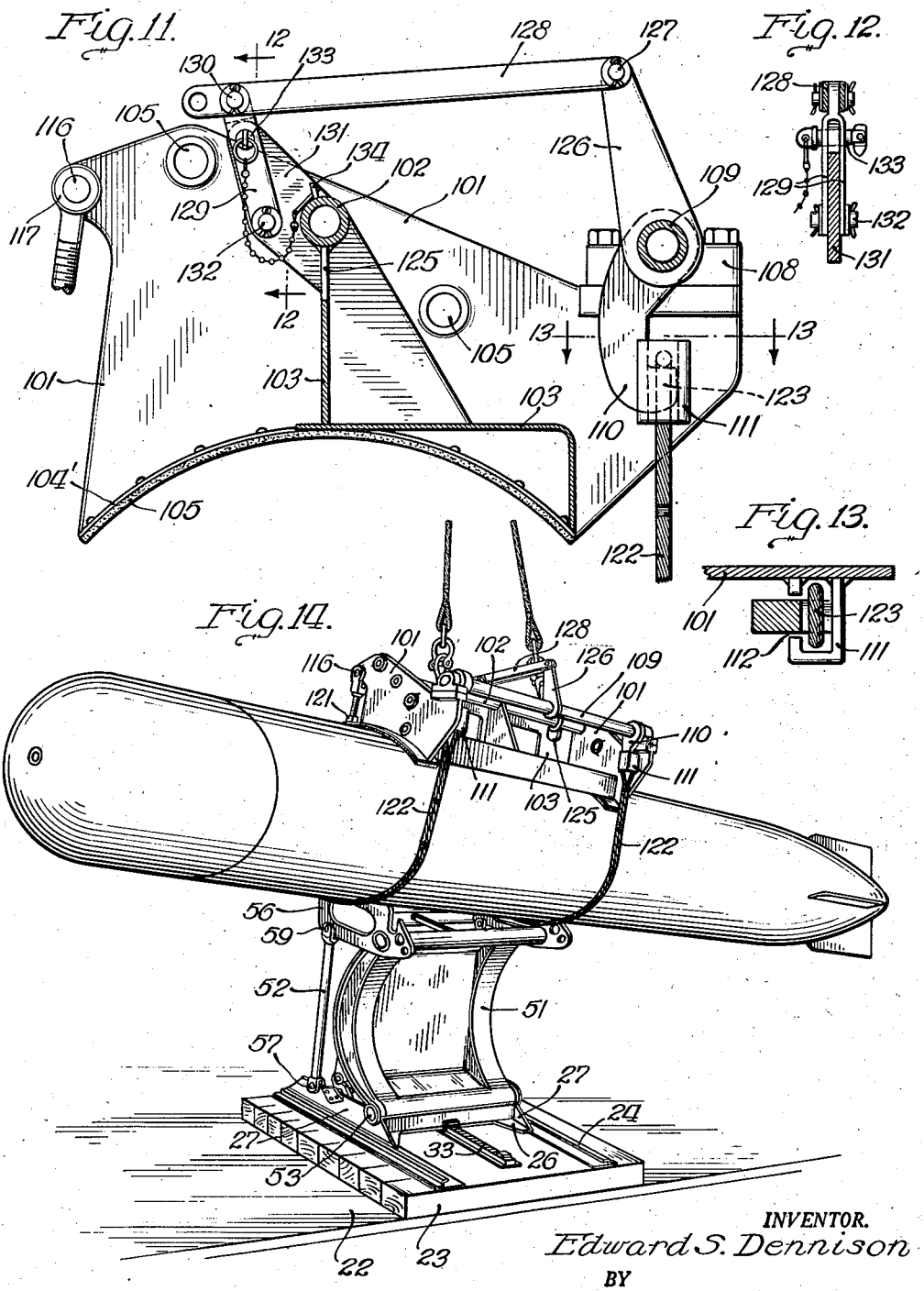

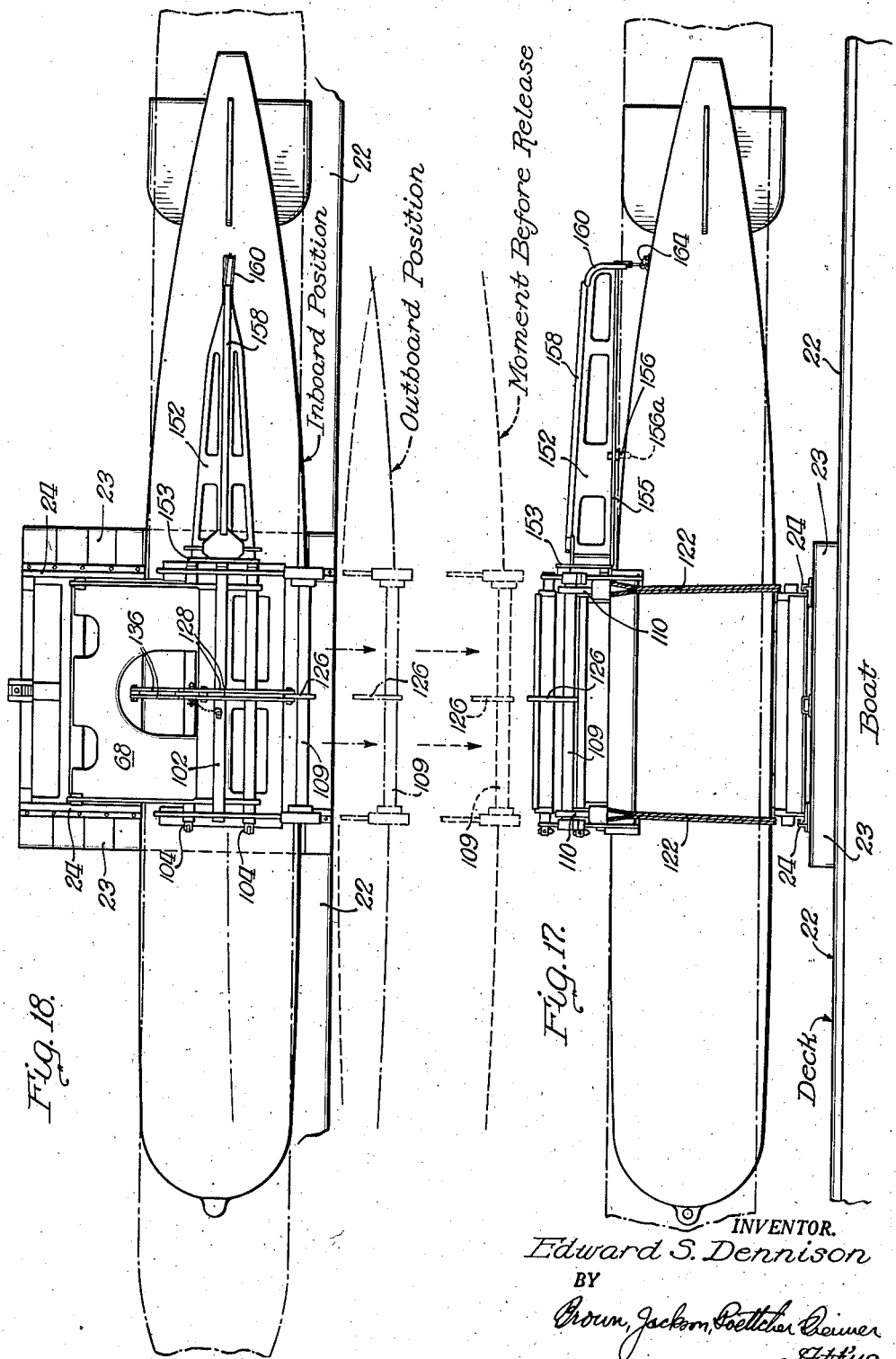

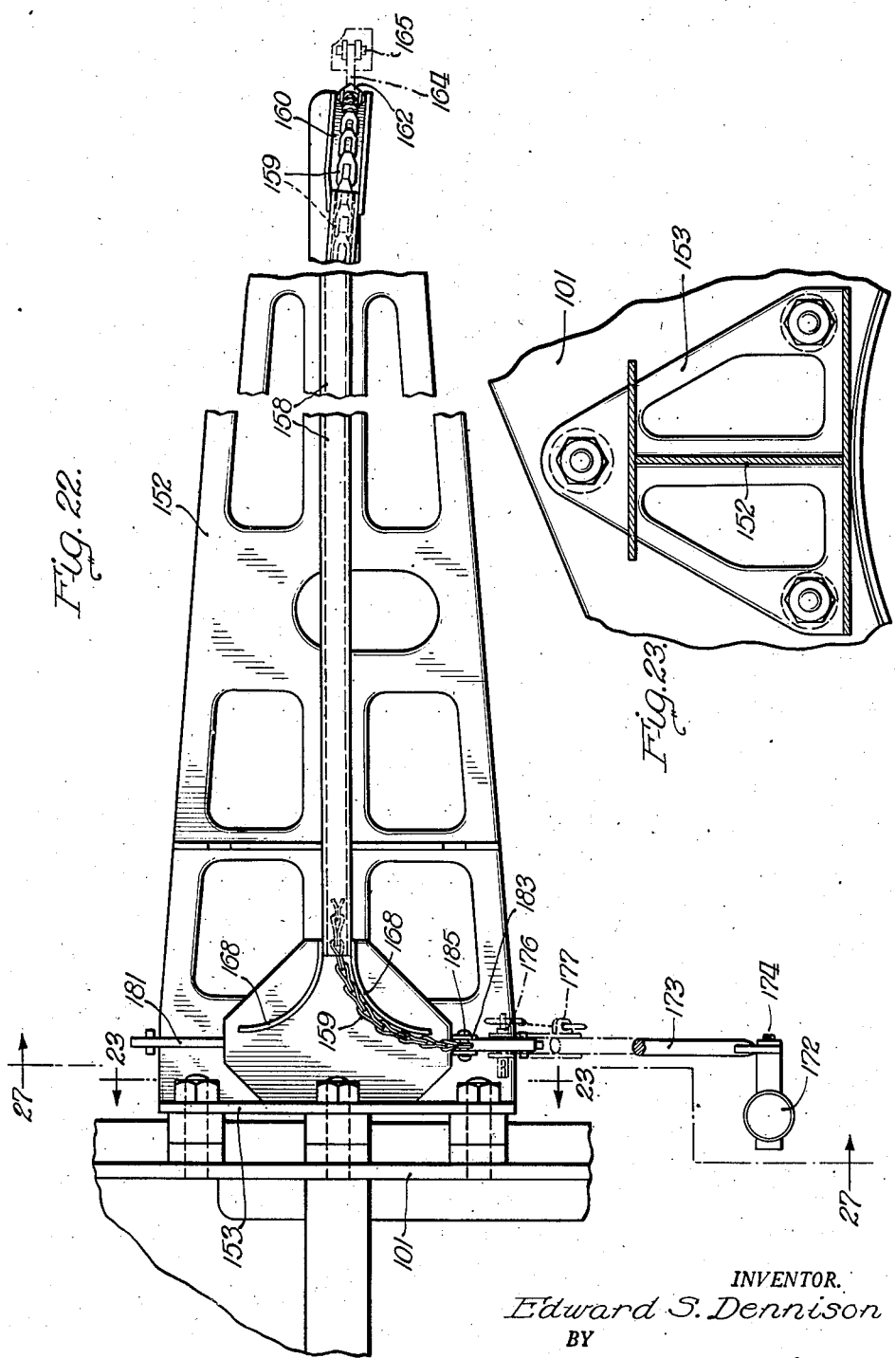

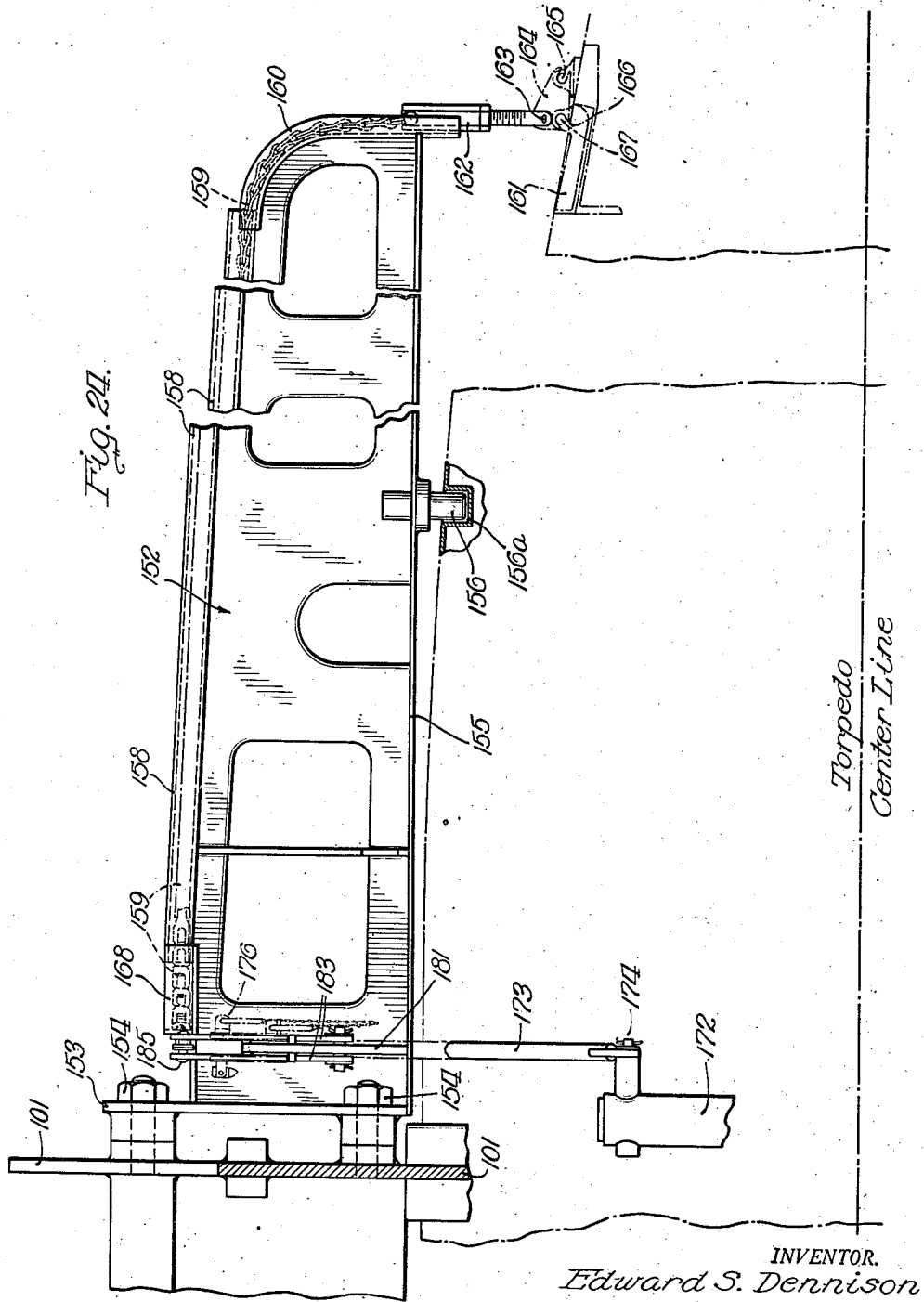

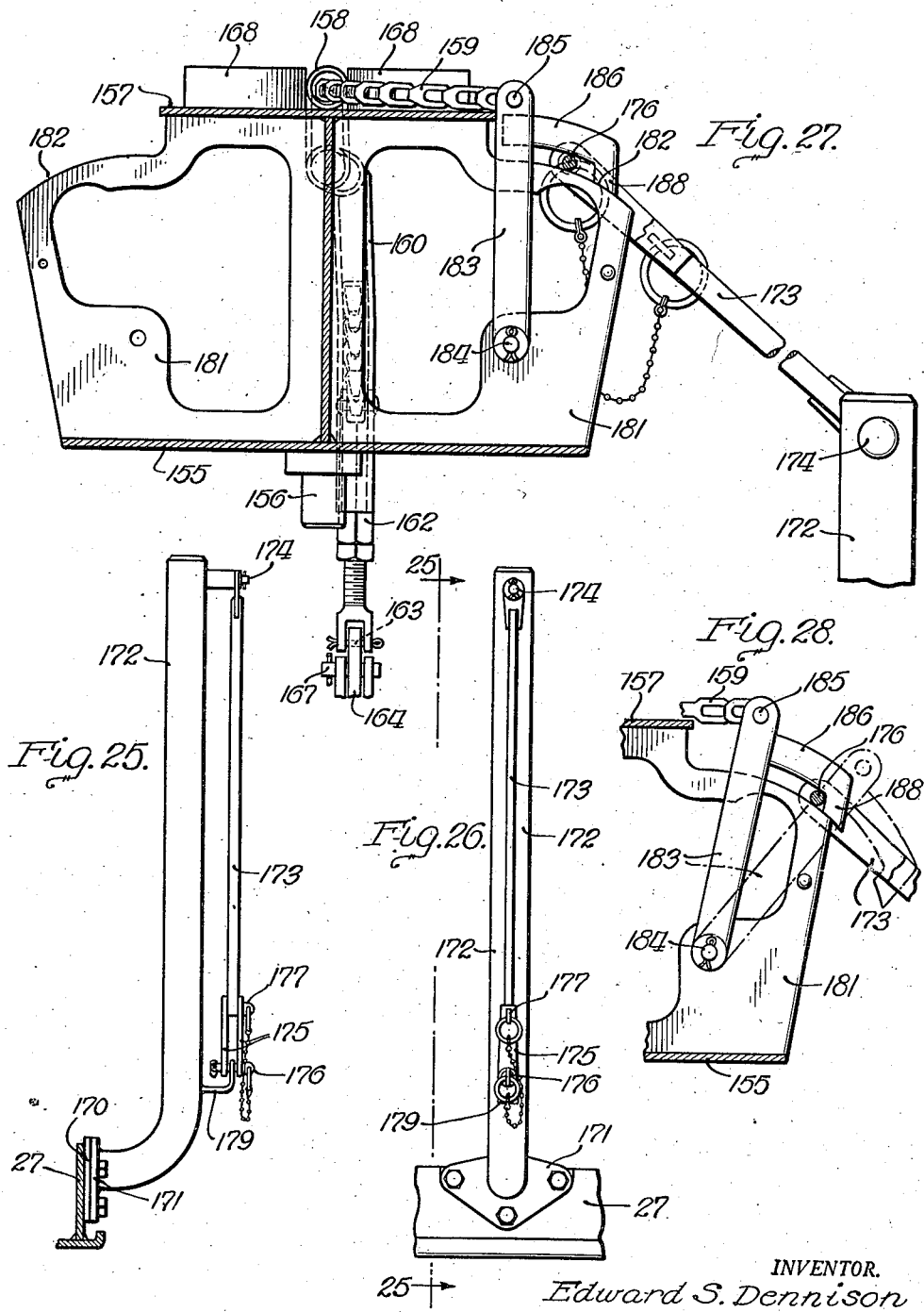

Patented Oct. 16, 1945

2,387,124

UNITED STATES PATENT OFFICE 2,387,124

TORPEDO LAUNCHING GEAR

Edward S. Dennison, New London, Conn., assignor to Electric Boat Company, Groton, Conn., a corporation of New Jersey Application November 8, 1943, Serial No. 509,421

22 Claims. (Cl. 114—239)

My invention relates to the launching of torpedoes from surface naval craft, distinguishing, at the outset, from the usual practice of launching them from tubes by means of compressed air or an explosive charge.

The device of my invention was conceived in connection with, and is particularly adapted to, the arming of high-speed motor torpedo boats, which are relatively small, having a low freeboard, and which carry their torpedoes, ready for firing, on the deck; but it is within the purview of my invention to use my device on larger vessels, which may be provided with appropriate platforms for the purpose, suitably near the water line.

The device of my invention comprises a carriage in which the torpedo, ready for firing, is normally held, which is capable of an inherent movement imparting a simple lateral thrust to the torpedo and which is provided with means for releasing the torpedo in and by such movement, whereby the torpedo is delivered overside without rolling and with its axis at all times parallel to its original position.

In the device which I have devised, constructed and demonstrated, the carriage is in the form of a mechanical parallelogram, one link of which constitutes a base, so to be set upon its platform that the axes of the parallelogram are substantially parallel to the keel of the ship. The opposite link, which is the torpedo carrier, is thus capable of beam motion, parallel to the base and within limits, and it is that throw which imparts to the torpedo the lateral thrust above referred to. That motion is by gravity. When the parallelogram is in its normal, i. e. inward condition, and a torpedo is mounted in it, the center of gravity of the assembly is slightly outboard of vertical, but means is provided to check it there, subject to release at the proper instant. Upon release, gravity shifts the assembly to its outward condition and that movement also effects actuation of the firing lever of the torpedo and discharge of the torpedo, these functions being purposefully timed in a manner hereinafter explained.

The carrier above referred to comprises a so-called "hanger" and a cradle which is readily fixedly attached thereto and detached therefrom and which may independently be accurately saddled and cinched upon a torpedo on a loading dock, this sub-assembly being then easily transferable by derrick from dock to launching gear.

Numerous advantages, over prior practices, will appear to those skilled in the art, and I shall refer to the more outstanding of such advantages after explaining my invention in detail.

The device which I have devised, constructed and demonstrated is illustrated in the accompanying drawings, in which Figure 1 shows, in side elevation, a motor torpedo boat with my gear mounted on the deck thereof and holding a torpedo ready for firing;

Figure 2 is a front elevational view of the gear, i. e. as in a beam view of the boat;

Figure 3 is an end elevational view, showing the gear in normal torpedo-carrying condition and position;

Figure 4 is a detail view of a portion of the hanger;

Figure 5 is a view similar to Figure 3, but taken on the plane of the line 5—5 of Figure 2, showing the gear in its so-called "outboard" position and illustrating it in its outward condition in dotted lines;

Figure 6 shows the lower portion of the gear in plan;

Figure 7 is a vertical sectional view taken on the plane of the line 7—7 of Figure 6 and looking in the direction indicated by the arrows;

Figure 8 is a partial end view taken from the left of Figure 7, parts being broken away to reveal otherwise hidden portions;

Figure 9 is a partial vertical sectional view taken on the plane of the line 9—9 of Figure 7 and looking in the direction indicated by the arrows;

Figure 10 is a partial vertical sectional view taken on the plane of the line 10—10 of Figure 7 and looking in the direction indicated by the arrows;

Figure 11 is a partial vertical sectional view taken on the plane of the line 11—11 of Figure 2 and looking in the direction indicated by the arrows;

Figure 12 is a detail sectional view taken on the plane of the line 12—12 of Figure 11 and looking in the direction indicated by the arrows;

Figure 13 is a detail sectional view taken on the plane of the line 13—13 of Figure 11 and looking in the direction indicated by the arrows;

Figure 14 is a perspective view illustrating the loading operation;

Figures 15 and 16 are detail views showing how torpedoes of different sizes are accommodated;

Figures 17 and 18 are more-or-less diagrammatic views, in front elevation and plan respectively, showing a torpedo, of one size in full lines and of another size in dotted lines, loaded into the gear, and also showing phases of the launching operation in dotted lines;

Figures 19, 20 and 21 are more-or-less diagrammatic views, in end elevation, showing the launching operation;

Figure 22 is a partial plan view showing the means provided for actuating the firing lever of the torpedo;

Figure 23 is a cross sectional view taken on the plane of the line 23—23 of Figure 22 and looking in the direction indicated by the arrows;

Figure 24 is a front elevational view of the structure shown in Figure 22;

Figures 25 and 26 are, respectively, end and rear elevational views of the stanchion which is used as an anchor for the firing pull, as will be explained;

Figure 27 is a vertical sectional view taken on the planes of the dot-and-dash lines 27—27 of Figure 22 and looking in the direction indicated by the arrows; and Figure 28 is a partial view, similar to Figure 27, showing the action of the parts there illustrated.

As before stated, Figure 1 illustrates a motor torpedo boat equipped with the torpedo launching gear of my invention. But one such gear is shown, toward the stern on the port side; another is, in practice, similarly located on the starboard side and it may also be the practice to carry two, in tandem, on each side.

The deck, indicated at 22, in Figures 2, 3 and 5, is provided with a reinforcing block platform 23 upon which a pair of guides 24, running athwartships, are secured, and the carriage which will be described is mounted in these guides for inboard and outboard movement, as will presently appear.

The base of the carriage comprises the horizontal plate 26 (see Figures 6 and 7) with side members 27, 27, thus to produce a shallow U-shaped formation, with cross-members 29, 29 and 30, the whole being welded together to form a sturdy supporting structure. At each side, at the bottom, a runner 28 is provided, and these runners are mounted to slide in the guides 24, 24.

Midway between the guides 24, 24, and parallel thereto, a rack 33 is secured to the platform by means of bolts 34, 34 passing through stop blocks 35, 35, and this rack is embraced by an inverted channel 36 welded in the base member 26, as best shown in Figure 7.

The channel 36, near its rear end, is surmounted by a pinion housing 37 (see Figures 6 and 9), and a pinion 38, indicated in dotted lines in Figure 9, is journaled in that housing, its shaft 39 extending outside and being there formed to receive a ratchet wrench. The pinion 38 meshes with the rack 33 and, as it is rotated by the manipulation of the ratchet wrench, the carriage base is moved either inboard or outboard as desired. In transport, the carriage occupies the inboard position, as indicated in Figure 3.

Means is provided for positively locking the carriage in either its inboard or its outboard position, this means being a bolt 40, sliding in a housing 41 on the base and adapted to be inserted in one or the other of two openings 42 in the rack 33. For safety, this bolt may be locked in its thrown position by means of a toggle pin 43 passing through openings in the bolt and housing. This pin is so-called because it is provided with a toggle nose 44 pivoted in its bifurcated end; this nose, when aligned with the shank, facilitates insertion of the pin in the openings, and, when passed through the openings, hangs to prevent accidental withdrawal. This pin is loosely chained to a conveniently nearby stud 45.

The base which has been described is one link of a mechanical parallelogram. The opposing link is the hanger 50, and the other two links are the frame 51, of crescent formation for reasons which will presently appear, and the tie rods 52, 52.

The cresent frame 51 is mounted on the shaft 53, which is mounted in the bearings 54, 54 forwardly on the side plates 27, 27, and thus the crescent frame swings on the axis of that shaft. At its upper end, the crescent frame 51 is pivoted to the forward portion of the hanger 50 by means of the shaft 55 (Figures 4 and 5) mounted in the side plates 56, 56 of the hanger 50.

There is a tie rod 52 on each side of the carriage, each provided at each end with a clevis, the lower one pivoted on a short shaft 57 mounted in bearings 58, 58 rearward on the base, and the upper one pivoted rearwardly to the corresponding side plate 56 of the hanger 50 by means of a pin 59.

The crescent frame 51 is made up of two crescent shaped members, of sheet steel, one on each side, with a sheet steel plate 60 of channel cross-section between them.

The hanger 50 is made up of the two side plates 56, 56, already referred to, the tubular cross member 66, at the upper rear thereof, which member serves as a retrieving bar, as will be later explained, a cross plate 67, and a top plate 68, all welded together to make a sturdy structure.

It is now clear that, with the base stationary, the other links of the articulated parallelogram may be swung about the pivots so that the hanger 50 may have motion parallel to the base link, from a normal inward condition to an outward delivery condition as will more fully appear presently. It will also appear presently that this motion is by gravity. Welded to the back of each of the two crescent frame side members, there are a pair of rearwardly and downwardly extending ears 71 having a pin 72 mounted in them near their ends. This cross pin is adapted to be engaged by a retention hook 73 mounted on the corresponding short shaft 57 already referred to (see Figures 5, 6, 7 and 8). A torsional spring 74, surrounding the hub of the hook 73, and engaging between a portion of the base and the hook, tends to throw the hook 73 out of engagement with the pin 72, and the hook is held in engagement with the pin by the mechanism now to be described.

Mounted in bearings 77, 77, standing upright from the bottom plate 26 of the base is a shaft 78 (Figures 6, 7, 8, 9 and 10). Near each of the ends of this shaft, just inside the bearings, and in alignment with the corresponding retention hook 73 is a catch hook 79, which is adapted to catch on to the free end of the tail 73a of the corresponding hook 73, as best shown in Figure 8.

Also fixedly mounted on this shaft 78 is an upwardly extending lever 81, between which and a portion of the base a tension spring 82 is connected, this spring urging the lever 81 in a counterclockwise direction (Figure 9), normally holding the shaft 78 in such position that the catch hooks 79, 79 will engage the tails 73a of the hooks 73 as above described. This lever 81 is made in the form of a bell crank, so that the other arm 83 thereof may cooperate with a lug 84, extending upwardly from the base, as best shown in Figure 9, this lug and the arm 83 being provided with openings 85 and 86, respectively, which are in alignment when the lever 81 is in its normal position with the catch hooks 79, 79 engaging the tails 73a, 73a of the hooks 73, 73. A toggle pin 87, of the same nature as the toggle pin 43 already described, and chained to a nearby stud 88, may then be inserted in these aligned openings so as to prevent unintentional rotation of the shaft 78 and release of the retention hooks 73, 73.

The lever 81 is of such length and is in such position that it may be engaged by the foot of the operator, and it will now be clear that when the toggle pin 87 is removed and the lever 81 is pushed in the direction of the arrow of Figure 9, as indicated, the catch hooks 79, 79 will be swung clockwise (Figure 8) to release the tails 73a, 73a of the hooks 73, 73 permitting the same to swing counterclockwise and thus to free the parallelogram to move outwardly in a manner which will presently be more fully described.

The shaft 78 may also be actuated by mechanism best shown in Figures 6 and 10. A hydraulic cylinder 90 is mounted on a portion of the base, in proximity to the shaft 78, and its piston is subject to fluid pressure entering the cylinder by way of a tube 91 leading from a suitable source. The piston rod 92 extends toward the shaft and is engaged by a follower 93, mounted in bearing 94, this follower being, in turn, engaged by the forked lever 95 to transmit movement thereto. Upon admission of fluid under pressure to the cylinder 90, the piston is forced outwardly, rotating the shaft 78 clockwise, as indicated in Figure 10.

Thus, the operation of the gear may be effected by remote control, or, as above described, it may be operated by direct manipulation of the lever 81 if the operator is on deck.

I shall now describe the torpedo carrying cradle which is adapted to be received by a hanger 50, reference being made particularly to Figures 2, 3, 5 and 11.

This cradle, which is adapted to be saddled on to the torpedo and which comprises means for holding the torpedo thereto and releasing it therefrom, comprises two side plates 101, 101 joined by a tubular cross member 102 and cross plating 103, 103, all welded together to make a sturdy structure. Each side plate, at the bottom, is formed with an arcular flange 104', presenting a surface to receive the torpedo, this surface being covered by a lining 105, preferably of leather belting.

The upper edges of the side members 56, 56 of the hanger are notched, as indicated at 56a (see also Figure 4), for the reception of the cross member 102, and they are also provided with openings 56b, 56b, for the reception of large insertable and removable toggle pins 104, 104. The cradle rather embraces the forward portion of the hanger, the side members of the former lying outside the side members of the latter; in this connection, it will be noted that the vertical member of the cross-plating 103 stops short of the side plates to accommodate the forward ends of the side plates of the hanger. The cross member 102 of the cradle rests in the notches 56a, 56a of the side members of the hanger, and the toggle pins 104, 104 pass through openings 105, 105 in the side plates of the cradle, which openings register with the openings 56b, 56b, in the hanger side plates, already referred to.

It will thus be seen that the cradle may be hung upon the hanger by means of these three supporting cross elements, and, so assembled, the cradle becomes, in effect, a rigid part of the hanger. The purpose, as will be seen, is to permit the cradle, as an independent unit, to be applied to and to carry the torpedo from the loading dock, by means of an ordinary derrick, to the hanger, the cradle then becoming in effect a part of the hanger.

I shall now describe the means whereby the torpedo is carried by the cradle.

Journaled in bearings 108, 108 on the side plates 101, 101, is a shaft 109, having welded thereto, near each end, just inside the bearing, a hook 110 cooperating with a hook housing 111 extending inwardly from each side plate, as particularly shown in Figures 11 and 13. This hook housing 111, as will be there seen, is open at top and bottom and is slotted at the rear, as indicated at 112, for reception of the corresponding hook 110. The normal position for these hooks is within the housings, as shown in Figures 11 and 13.

The torpedo is held to the cradle by means of two slings suspended by way of clevises 117, 117 and pins 116, 116, from the respective side plates 101, 101. The clevises are connected with cable sockets 118, 118, through turnbuckles 121, 121, and one end of a wire cable 122 is firmly anchored in each socket 118. The cables 122, 122 are adapted to pass around the torpedo, as shown in Figures 3, 5 and 14, and their free ends are looped, as indicated at 123, 123, for reception of the hooks 110, 110, inside the hook housing 111, 111. The cables are made of proper length, and the turnbuckles are provided for adjustment, to the end that, when the looped ends of the cables are engaged by the hooks in the hook-housings, the two slings will hold the torpedo firmly to the arcular bottom surfaces of the cradle.

It will now be apparent that the cradle, with slings dangling, as an independent unit, may be placed on a torpedo on the loading dock, the slings then brought around under the torpedo, their looped ends inserted into the hook housings, and the hooks moved inwardly into the loop ends, thus firmly holding the torpedo to the cradle, and this sub-assembly then transported by derrick to the gear on the boat at the dock, as illustrated in Figure 14. The main vertical member 103 of the cross bracing of the cradle is provided with openings 125, 125 to permit the hoist hooks to engage the tubular cross member 102, which is so located, relative to the center of gravity of the sub-assembly, that the cradle will occupy an adaptable position for fitting to and embracing the hanger, as heretofore described.

Welded to and extending upwardly from the shaft 109, at about the center thereof, there is an arm 126, which forms a knock-out lever. Extending rearwardly from the upper end of the lever 126, pivoted thereto by means of pin 127, is a link 128 comprising two spaced members, pivoted by means of pin 130, near the rear end thereof, to a forked idling link 129 which, in turn, is pivoted by means of pin 132 to extension plate 131 on the cradle structure. Thus the link 128 may swing forward and back, operating the knock-out lever accordingly (Figure 11), and means is provided whereby this swinging arrangement may be locked in position with the hooks 110, 110 within the hook housings 111, 111. With the parts so positioned, an opening in plate 131 and openings in the link 129 are in register, and a toggle pin 133, chained to a nearby stud 134, may be inserted therein (see Figure 11). In this wise, when the cradle is applied to the torpedo on the dock, and the hooks 110, 110 hold the ends of the slings in the housings 111, 111, the safe mounting of the torpedo in the cradle is assured, and, as will appear, this safety provision continues after the cradle has been mounted on the hanger and until the gear is made ready for a launching operation.

I shall now describe the mechanism whereby the torpedo is released from the cradle.

At the middle of the back of the crescent frame 51 there is provided an upward extension 135, to which a link 136 is connected by way of a pivot pin 137 and lost motion slot 138, and the free end of that link 136 is adapted to be pivotally connected with the free end of the link 128 by means of the toggle pin 133 when it has been removed from the plate 131 and link 129 to put the arrangement in operative condition (see Figure 3). As will appear presently, when the parallelogram is moved to outward condition, the pin 137 moves in the slot 138, reaches the end thereof, and then urges the link 136 upwardly and the link 128 forwardly, to the end of swinging the knock-out lever and moving the hooks 110, 110 out of their housings 111, 111. This action is indicated in dotted lines in Figure 5. It will be noted that on the back of each side member of the crescent frame there is bolted a pad 142 of rubber or similar material, and these pads engage the tubular cross member 66 of the hanger when the parts are in this outward condition, as indicated in Figure 5, thus limiting the outward movement but absorbing the shock upon impact.

The mechanism which constitutes the means for delivering the torpedo overside has now been described; and I shall now describe the operation thereof before going to description of the means for actuating the firing lever of the torpedo.

I shall assume that a torpedo has been loaded to the gear, as illustrated in Figure 14, and that the gear is in the condition and position illustrated in Figure 3. This is the condition for transport. The carriage is in its inboard position, and so locked by the bolt 40 in the inboard hole 42 in the rack 33, and the safety toggle pins 43, 87 and 133 are in their safety positions.

In approaching the area of operation, the bolt 40 is raised, the ratchet wrench is applied to the shaft 39 and the pinion 38 is rotated to move the carriage to the outboard position, indicated in full lines in Figure 5, whereupon the bolt 40 is moved down into the outboard hole 42 in the rack and the safety pin 43 is reinserted to lock the carriage in that position.

Preparatory to launching, the pin 133 is removed from the plate 131 and link 129 and inserted to connect link 128 and link 136, thus to render the knock-out lever 126 capable of operation, and the safety pin 87 is removed to render the shaft 78 capable of rotation.

The boat is then maneuvered to aim the torpedo to its target in anticipation of the moment of release, and the gunner is ready, either with his hand on the valve controlling fluid pressure to the tube 91 and cylinder 90, or on the deck with his foot applied at the lever 81 ready to move it in the direction indicated by the arrow in Figure 9.

On the fire signal, the shaft 78 is rotated, by one of said means or the other, as indicated in Figures 9 and 10. This action swings the catch hooks 79, 79, on the shaft 78, to the right, as indicated by the arrow *a* of Figure 8, permitting the retention hooks 73, 73 to swing in the direction of the arrow *b* of Figure 8.

The center of gravity of the parallelogram, with the torpedo assembled thereto, is outboard of vertical, gravity thus exerting its pull in the direction of moving it to its outward condition, resulting in upward pull of the pins 72, 72 against the upper lip of the hooks 73, 73. The axis of the pins 72, 72, in normal position, is to the right (Figure 8) of the axis of the shafts 57, 57, and the tendency of the upward pull of the pins 72, 72 is to rotate the retention hooks 73, 73 counter-clockwise (Figure 8) to permit the pins 72, 72 to release themselves.

Release of the catch hooks 79, 79, frees the entire swinging structure, with the torpedo to swing outwardly by gravity.

In the first part of this movement the pin 137 moves upwardly in the lost motion slot 138, and there is no relative movement of the knock-out lever 126, but, when the pin reaches the end of that slot, the linkage begins to move the knock-out lever, in a clockwise direction (Figure 5), and continued movement of the swinging structure results in the movement of that lever to the point where the hooks 110, 110 are entirely withdrawn from the end loops of the sling cables 122, 122, and that is the moment of release of the torpedo.

Figure 19 illustrates movement of the carriage from inboard (transport) position to outboard (operating) position. Figure 20 illustrates the first portion of the outward movement of the swinging structure, i. e. that part of the movement before the pin 137 reaches the end of the lost motion slot 138; that point is the beginning of motion of the knock-out lever 126; and Figure 21 illustrates the remaining movement of the swinging structure and the movement of the knock-out lever sufficiently to release the sling cables and to deliver the torpedo overside. This instant is just before the swinging structure has reached the limit of its motion, as indicated in Figure 5, when the pads 142, 142 encounter the cross tube 66 of the hanger, as has been described.

The action of the parallelogram does not impart rolling motion to the torpedo, i. e. rotation on its own axis, and the movement of the torpedo, upon release from the cradle is downwardly from it so that no rolling motion is imparted to the torpedo by that action. The movement does however impart an outward thrust to the torpedo, so that it is literally thrown outwardly overside, clear of the boat, at the same time retaining its axis parallel to what it was at the time it was aimed. The path of the axis of the torpedo, in delivery overside, is indicated by dot-and-dash arrows in Figures 5 and 21.

After the launching of the torpedo, the swinging structure is pulled inwardly, by hand, by grasping the cross tube (retrieving bar) 66 of the hanger; the top plate 68 of the hanger being provided with suitable hand holes to permit such access thereto. Lightened by the weight of the torpedo, this is an easy operation, the center of gravity of the swinging structure minus the torpedo being such that when it is in normal position it is slightly inboard of vertical.

In bringing the swinging structure back to normal position, the pins 72, 72 reengage with the retention hooks 73, 73. The springs 74, 74 hold the hooks 73, 73 in open position, i. e. to the left (Figure 8) so that they are in position to receive the pins 72, 72; when the pins 72, 72 strike the flats 73b, 73b of the retention hooks, their continued movement, back toward normal position, swings the hooks clockwise (Figure 8) to bring the tails thereof into latching engagement with the catch hooks 79, 79 which are urged to the left, as already described, by the spring 82 and which are chamfered as shown to permit such action. When the tails 73a, 73a are caught under the hooks 79, 79, the parallelogram has been restored to its normal position; thereupon the safety pin 87 is reinserted in its openings to lock the structure against any possible accidental movement, the bolt 40 may again be raised and the pinion 38 manipulated to move the carriage back to its original inboard position, where it may again be locked as already described, and the pin 132 may be removed from the links 128 and 136 and restored to the link 129 and 131, to render the cradle ready for a new loading.

Figures 17 and 18 illustrate, in full lines, a torpedo of certain size carried in the launching gear of my invention. Also illustrated, in these figures, is another size of torpedo, shown in dot-and-dash lines. The manner of accommodating the two different diameters is illustrated in Figures 15 and 16, the latter showing spacers 150, 150, which are provided to afford firm seating of the torpedo of smaller diameter.

I shall now describe the means for operating the firing lever of the torpedo.

On the stern side of the cradle, of the launching gear, as shown in Figures 17 and 18, there is provided a boom 152 which is shown in further detail in Figures 22, 24 and 27. This boom is generally of skeleton I-beam formation, having a transverse end plate 153 which is bolted to bosses on the end plate 101 of the cradle by means of bolts 154, 154. It will be observed that both side plates of the cradle are provided with such bosses for the reception of such bolts, and that is so in order that a boom of the same construction may be attached at either end, thus permitting a standard construction for use on either side of the boat. The bottom member 155 of the boom is provided with a stud 156 which takes into a corresponding socket 156a in the torpedo, whereby the torpedo is definitely located in the cradle.

The top member 157 of the boom is provided with a lengthwise channel 158 for a chain 159 which, as will appear presently, is used to actuate the firing lever of the torpedo. At the stern end of the boom, there is provided a downwardly curved channel 160, supplementing the channel 158 and extending toward the firing lever 161 of the torpedo (Figure 24). The chain passes through this channel and is provided at its end with a turnbuckle 162 which has pivoted thereto, by means of a pin 163, a lever 164 notched to engage a pivot pin 165 on the torpedo. This lever has also a notch 166 operatively to engage the pin 167 on the firing lever 161. When the parts are in normal position, the torpedo in its cradle ready for firing, they are so disposed that they hold the firing lever in safe position.

At the forward end of the channel 158, the curved guide member 168 is provided and, against this guide, the chain 159 is led to an actuating mechanism which will now be described. Such a guide member 168 is provided in both sides so that the same boom construction may be used whether on one side or the other of the launching gear.

As shown in Figures 2, 5 and 6, the side members 27, 27 of the base are provided with pads 170 for the reception of the supporting foot 171 of a stanchion 172. Here again, so that the same boom may be used on one side or the other of the gear, both side members are provided with such pads, as indicated in Figures 2 and 6. On the side where the boom 152 is located, there the stanchion 172 is thus provided, this stanchion acting as an anchor for a pull on the chain 159, as will now be set forth.

As shown in Figures 22 and 24, and as best shown in Figures 25 and 26, a link rod 173 is attached to the upper end of the stanchion on the pivot pin 174. The free end of this link rod 173 is yoked as shown at 175 and a toggle pin 176 is there provided, loosely chained to a stud 177 on the rod. This pin is adapted to take into alined openings in the yoke ends 175, and, when the link rod 173 is not in use and should be held against swinging, into an opening in a bracket 179 on the stanchion. However, as will be seen, this pin has a more important function.

As best shown in Figures 22 and 27, the boom 152 has a cross web 181, the upper edges 182 of which form cam surfaces. Here again, the structure is made symmetrical so that the same construction may be used at either end of the launching gear. This web 181 is positioned where the chain 159 is turned to the side by the guide 168, and a twin link 183, pivoted to the web at 184, has the end of the chain fastened to its upper end by means of the pin 185.

An L-shaped catch member 186 is secured between the two members of the link 183, thus in the same vertical plane as the web 181, the reach arm extending more or less parallel to the cam surface 182 and the other downward arm 188 acting as the hook thereof. The link rod 173 on the stanchion 172 is of such length that, when the parts are all in normal position, i. e. with the torpedo in the cradle ready for launching, the opening through which the pin 176 extends is located in immediate proximity to the catch member and the cam surface 182, with the bifurcated ends of the link rod 173 embracing them. Thus, as illustrated in Figure 27, with the link rod in that position, and the pin 176 inserted in its opening, the pin rides on the cam surface 182 and lies below the reach arm of the catch member and a short distance from the hook arm 188.

When the parts are in normal position, with the torpedo ready for launching, the chain 159 is taut, and, in the first slight movement of the parallelogram the hook arm 188 moves to engagement with the pin 176. From that moment, further outward movement of the parallelogram results in the holding back of the hook arm 188 by the pin 176 and the swing of the link 183 into the position shown in Figure 28, which means that the chain 159 pulls on the lever 164, swings it about its pivot 165, and, in so doing, actuates the firing lever 161, placing the gyroscope of the torpedo in operation. In this action, the lever 164 is entirely freed from the torpedo. Further movement of the swinging structure (the stanchion being stationary) brings the hook 188 beyond the end of the cam surface 182 so that the pin 176 may fall out of engagement with both of them, thus entirely letting go of the link rod 173 which is attached to the stanchion.

During the further movement of the swinging structure, before the moment of release, the gyroscope of the torpedo is brought up to speed, so that, at the moment of release, the gyroscope will be up to speed and in operation for the aimed direction. The remaining movement, as already described, effects the release of the torpedo from the cradle. In actual trial of the gear of my invention, the release of a torpedo has been accomplished in .7 second from the moment of operation of the shaft 78; there was no action in the first .1 second; at that point the torpedo lever was actuated, unlocking the gyroscope, and .4 second was allocated to permitting the gyroscope to come up to speed; leaving .2 second for the actual release of the torpedo.

Many advantages in launching the torpedoes by the gear and in the manner described, over the old method of launching from tubes, will now be apparent.

Sheer saving in weight is important, particularly on small boats of the type already referred to. Tubes for expulsion by explosive charge are necessarily heavy in and of themselves and where expulsion by compressed air is used the added equipment for that purpose means that added weight. The launching gear of my invention is relatively light, about half the weight of tube equipments.

Reliability is another factor. With tubes, when firing with powder, it is difficult, if not impossible, to keep the charge dry on the deck of a boat of the type referred to. Firing from tubes with compressed air inherently involves the well known vulnerabilities of any compressed air system.

Servicing torpedoes when in tubes, particularly on such small boats, is difficult, both from the standpoint of available crew and available deck space. It is necessary to withdraw the torpedoes from the tube for the purposes of inspection and adjustment. In the case of the launching gear of my invention, the torpedoes are fully exposed at all times, subject to inspection and adjustment without disturbing their mounting in any way.

Tubes are made to fit but one diameter of torpedo. In the case of the launching gear of my invention, different sizes can readily be accommodated by the same gear, as already pointed out.

Loading of torpedoes into tubes, particularly in rough weather, is extremely difficult. The relative simplicity of loading in the case of the launching gear of my invention has already been described. The same is true of the unloading of torpedoes not wanted.

The elements of the launching gear of my invention are simple and certain of operation, and are such that they lend themselves readily to variation in timing of the various actions involved as best practice may dictate.

I claim:

1. In a torpedo launching gear, a base, a hanger mounted on said base and having a throw relative thereto, a cradle fixedly but removably attached to said hanger and presenting a surface to receive a torpedo, means for supporting a torpedo upon said surface, and means for releasing said supporting means when said hanger moves in its throw.

2. In a torpedo launching gear, a base, a hanger mounted on said base and having a throw relative thereto, a cradle fixedly but removably attached to said hanger and presenting a surface to receive a torpedo, slings for supporting the torpedo, hooks for the ends of said slings, and means operating by the throw of said hanger for moving said hooks to release said slings.

3. In a torpedo launching gear, a base, a hanger mounted on said base and having a throw relative thereto, a cradle adapted independently to be saddled on a torpedo, slings suspended from said cradle and adapted to pass around said torpedo, hooks on said cradle for engaging the free ends of said slings, means for attaching said cradle to said hanger to be supported thereby, and linkage connected between said hooks and the hanger mounting, whereby the throw of the hanger operates to move said hooks to disengage said slings to release the torpedo.

4. In a torpedo launching gear, a base adapted to be mounted on the deck of a vessel, means for holding said base to the deck subject to movement abeam, means for moving said base relative to said holding means into inboard and outboard positions, a hanger mounted on said base and having a throw relative thereto, and releasable means for supporting a torpedo from said hanger.

5. In a torpedo launching gear, a platform on the deck of a vessel, a pair of guides secured to said platform, a base mounted in said guides to be moved abeam, a rack on said platform, a pinion on said base and meshing with said rack, whereby when said pinion is rotated said base is moved in said guides, a hanger mounted on said base and having a throw relative thereto, and releasable means for supporting a torpedo from said hanger.

6. In a torpedo launching gear, a base adapted to be mounted on the deck of a vessel, a hanger mounted on said base and having a throw abeam relative thereto, and releasable means for supporting a torpedo from said hanger, the center of gravity of the assembled moving structure being outboard of vertical, means for normally retaining said assembled moving structure against outward movement, and means for actuating said retaining means to release said assembled moving structure to move outwardly by gravity.

7. In a torpedo launching gear, a base adapted to be mounted on the deck of a vessel, a hanger mounted on said base and having a throw abeam relative thereto, and releasable means for supporting a torpedo from said hanger, the center of gravity of the assembled moving structure being outboard of vertical, means for normally retaining said assembled moving structure against outward movement, and hydraulically operating means for actuating said retaining means to release said assembled moving structure to move outwardly by gravity.

8. In a torpedo launching gear, a base adapted to be mounted on the deck of a vessel, a hanger mounted on said base and having a throw abeam relative thereto, and releasable means for supporting a torpedo from said hanger, the center of gravity of the assembled moving structure being outboard of vertical, means for normally retaining said assembled moving structure against outward movement, and a foot actuated lever for actuating said retaining means to release said assembled moving structure to move outwardly by gravity.

9. In a torpedo launching gear, a base adapted to be mounted on the deck of a vessel, a hanger mounted on said base and having a throw abeam relative thereto, and releasable means for supporting a torpedo from said hanger, the center of gravity of the assembled moving structure being outboard of vertical, means for normally retaining said assembled moving structure against outward movement, and hydraulically operating and foot operated means for actuating said retaining means to release said assembled moving structure to move outwardly by gravity.

10. In a torpedo launching gear, a four-link parallelogram structure, one link of which is a base mounted on the deck of a vessel and the opposite link of which is a hanger, whereby said hanger is capable of parallel motion relative to said base in a plane athwartship, and releasable means for supporting a torpedo from said hanger, the center of gravity of the assembled moving structure being outboard of vertical.

11. In a torpedo launching gear, a four-link parallelogram structure, one link of which is a base and the opposite link of which is a hanger, whereby said hanger is capable of parallel motion relative to said base, releasable means for supporting a torpedo from said hanger, the center of gravity of the assembled moving structure being outboard of vertical, means for normally retaining said assembled moving structure against outward movement, and means for actuating said retaining means to release said assembled moving structure to move outwardly by gravity.

12. In a torpedo launching gear, a four-link parallelogram structure, one link of which is a base and the opposite link of which is a hanger, whereby said hanger is capable of parallel motion relative to said base, releasable means for supporting a torpedo from said hanger, the center of gravity of the assembled moving structure being outboard of vertical, means for normally retaining said assembled moving structure against outward movement, means for actuating said retaining means to release said assembled moving structure to move outwardly by gravity, and means for releasing said supporting means when said assembled moving structure moves outwardly.

13. In a torpedo launching gear, a four-link parallelogram structure, one link of which is a base adapted to be mounted on the deck of a vessel and the opposite link of which is a hanger, whereby said hanger is capable of parallel motion relative to said base, releasable means for supporting a torpedo from said hanger, the center of gravity of the assembled moving structure being outboard of vertical, means for normally retaining said assembled moving structure against outward movement, means to release said assembled moving structure to move outwardly by gravity, means for limiting such outward movement of said parallelogram, and means actuated by such movement for releasing said supporting means to release the torpedo before said parallelogram reaches the outward limit of its movement.

14. In a torpedo launching gear, a four-link parallelogram structure, one link of which is a base and the opposite link of which is a hanger, whereby said hanger is capable of parallel motion relative to said base, a cradle adapted independently to be saddled on a torpedo, slings suspended from a cradle and adapted to pass around said torpedo, hooks on said cradle for engaging the free ends of said slings, means for attaching said cradle to said hanger to be supported thereby, linkage on said cradle for moving said hooks, and linkage on said parallelogram structure to be connected with said linkage on said cradle, whereby movement of said parallelogram operates to move said hooks to disengage said slings to release the torpedo.

15. In a torpedo launching gear, a four-link parallelogram structure, one link of which is a base and the opposite link of which is a hanger, whereby said hanger is capable of parallel motion relative to said base, a cradle adapted independently to be saddled on a torpedo, slings suspended from said cradle and adapted to pass around said torpedo, hooks on said cradle for engaging the free ends of said slings, said cradle having a supporting rod adapted to be hung in said hanger, insertable and removable pins for interengaging said cradle and said hanger, linkage on said cradle for moving said hooks, and linkage on said parallelogram structure to be connected with said linkage on said cradle, whereby movement of said parallelogram operates to move said hooks to disengage said slings to release the torpedo.

16. In a torpedo launching gear, a four-link parallelogram structure, one link of which is a base and the opposite link of which is a hanger, whereby said hanger is capable of parallel motion relative to said base, an oscillating shaft on said base, a retention hook on said shaft, means on said parallelogram for engagement by said hook, a second oscillating shaft on said base, a catch hook on said second shaft for engaging said retention hook to hold it in position to retain said parallelogram against operation, and means for moving said last named shaft to disengage said retainer hook from said catch hook.

17. In a torpedo launching gear, a base, a frame of crescent-shaped cross section pivoted thereto at the forward portion thereof, a hanger, means for pivoting said frame to the forward portion of said hanger, tie rods pivoted at one end to the rearward portion of said hanger and at the other end to the rearward portion of said base, and means for supporting a torpedo from said hanger in the concavity of said frame.

18. In a torpedo launching gear, a base, a frame of crescent-shaped cross section pivoted thereto at the forward portion thereof, a hanger, means for pivoting said frame to the forward portion of said hanger, tie rods pivoted at one end to the rearward portion of said hanger and at the other end to the rearward portion of said base, means for supporting a torpedo from said hanger in the concavity of said frame, the center of gravity of said assembly lying forward of gravity so as to urge said hanger forwardly, means for holding said hanger against such motion, and means for releasing said holding means.

19. In a torpedo launching gear, a base, a frame of crescent-shaped cross section pivoted thereto at the forward portion thereof, a hanger, means for pivoting said frame to the forward portion of said hanger, tie rods pivoted between the rearward portions of said hanger and said base, and a cradle hung upon said hanger and adapted to carry a torpedo in the concavity of said frame.

20. In a torpedo launching gear, a base, a hanger mounted on said base and having a throw relative thereto, releasable means for supporting a torpedo from said hanger, and means for connecting the firing lever of the torpedo with said base, whereby movement of said hanger relative to said base effects actuation of said firing lever.

21. In a torpedo launching gear, a base, a hanger mounted on said base and having a throw relative thereto, releasable means for supporting a torpedo from said hanger, means for connecting the firing lever of the torpedo with said base, whereby movement of said hanger relative to said base effects actuation of said firing lever, and means for automatically breaking said connection between said firing lever and said base.

22. In a torpedo launching gear, a base, a hanger mounted on said base and having a throw relative thereto, releasable means for supporting a torpedo from said hanger, means for connecting the firing lever of the torpedo with said base, whereby movement of said hanger relative to said base effects actuation of said firing lever, said means including a chain, a hook, and a lever pivoted to said base and engaging said hook, and means for retaining said lever in engagement with said hook during part only of the movement of said hanger.

EDWARD S. DENNISON.